(12) United States Patent
Blakemore et al.

(10) Patent No.: US 12,003,817 B2
(45) Date of Patent: *Jun. 4, 2024

(54) METHOD FOR DYNAMICALLY TRAINING A SYSTEM TO DETERMINE AN AGE RATING OF MEDIA CONTENT

(71) Applicant: British Board of Film Classification, London (GB)

(72) Inventors: Matthew James Blakemore, Hertfordshire (GB); Hristo Vladimirov Tomov, Sofia (BG); Georgi Stefanov Yanev, Sofia (BG)

(73) Assignee: BRITISH BOARD OF FILM CLASSIFICATION, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/309,287

(22) Filed: Apr. 28, 2023

(65) Prior Publication Data

US 2023/0269427 A1 Aug. 24, 2023

Related U.S. Application Data

(63) Continuation of application No. 17/666,758, filed on Feb. 8, 2022.

(30) Foreign Application Priority Data

Nov. 5, 2021 (GB) ...................... 2115955

(51) Int. Cl.
*H04N 21/454* (2011.01)
*H04N 21/258* (2011.01)
(Continued)

(52) U.S. Cl.
CPC ... *H04N 21/4542* (2013.01); *H04N 21/25883* (2013.01); *H04N 21/4532* (2013.01); *H04N 21/4662* (2013.01)

(58) Field of Classification Search
CPC ........... H04N 21/23418; H04N 21/251; H04N 21/26258; H04N 21/2668; H04N 21/8405
See application file for complete search history.

(56) References Cited

U.S. PATENT DOCUMENTS 9,015,151 B1 4/2015 Margulis et al.
9,674,579 B1 6/2017 Jaini et al.
(Continued)

FOREIGN PATENT DOCUMENTS

EP 4178207 A1 5/2023
WO 2023/078878 A1 5/2023

OTHER PUBLICATIONS

Extended European Search Report dated Sep. 8, 2022 issued in corresponding EP Application No. EP22156170.
Examination Report dated Jan. 24, 2024, issued in GB2115955.3.

*Primary Examiner* — Jason Salce
(74) *Attorney, Agent, or Firm* — ARENTFOX SCHIFF LLP

(57) ABSTRACT

A system and method for dynamically training a system to determine an age rating for media content. An exemplary method includes obtaining age rating data for a plurality of territories; determining, based on the age rating data, a similarity vector relating to the target territory; determining, for the similarity vector, a territory associated with a highest prediction score; in response to determining that the territory associated with the highest prediction score is not the source territory, generating a training dataset comprising the age rating data for the target territory, the source territory, and the territory associated with the highest prediction score; and executing a machine learning model, trained by the training dataset, to output an age rating for a content item in the target territory based on an age rating for the content item in the source territory.

18 Claims, 11 Drawing Sheets

(51) Int. Cl.
*H04N 21/45* (2011.01)
*H04N 21/466* (2011.01)

(56) References Cited

U.S. PATENT DOCUMENTS

| | | |
|---|---|---|
| 9,900,659 B1 | 2/2018 | Norum et al. |
| 10,223,438 B1 | 3/2019 | Xu et al. |
| 10,671,854 B1 | 6/2020 | Mahyar et al. |
| 11,310,563 B1 | 4/2022 | Polson et al. |
| 11,399,214 B1 | 7/2022 | Phillips et al. |
| 11,678,015 B1 * | 6/2023 | Blakemore ........ H04N 21/4542 725/28 |
| 2015/0052554 A1 | 2/2015 | Iyengar et al. |
| 2017/0011296 A1 | 1/2017 | Ahmed et al. |
| 2020/0021888 A1 | 1/2020 | De Mello Brandao et al. |
| 2021/0065043 A1 | 3/2021 | Sastri et al. |
| 2021/0224311 A1 | 7/2021 | Terrazas et al. |
| 2022/0360956 A1 | 11/2022 | Zaltzman et al. |
| 2022/0385974 A1 | 12/2022 | Phillips et al. |

\* cited by examiner $$H = \begin{pmatrix} h11 & h12 & \ldots & \ldots & \ldots & h1n \\ h21 & h22 & \ldots & \ldots & \ldots & h2n \\ h31 & h32 & \ldots & \ldots & \ldots & h3n \\ \vdots & \vdots & \vdots & \vdots & \vdots & \vdots \\ \vdots & \vdots & \vdots & \vdots & \vdots & \vdots \\ \vdots & \vdots & \vdots & \vdots & \vdots & \vdots \\ \vdots & \vdots & \vdots & \vdots & \vdots & \vdots \\ hm1 & hm2 & \ldots & \ldots & \ldots & hmn \end{pmatrix}$$

FIG. 4A

| B<br>A | Argentina | Australia | Austria | Brazil |
|---|---|---|---|---|
| Argentina | 100 | 73 | 77 | 73 |
| Australia | 68 | 100 | 63 | 70 |
| Austria | 50 | 45 | 100 | 46 |
| Brazil | 48 | 50 | 52 | 100 |

FIG. 4B

| B territory | Italy | France | USA | Canada-Quebec | Argentina |
|---|---|---|---|---|---|
| A rating | | | | | |
| Australia:MA15+ | 69 | 59 | 97 | 83 | 66 |
| Ireland:12A | 100 | 99 | 91 | 87 | 80 |
| Germany:16 | 60 | 52 | 84 | 84 | 66 |
| Hong Kong:IIA | 100 | 99 | 77 | 93 | 70 |
| UK:12 | 99 | 99 | 88 | 82 | 79 |

FIG. 4C

| B territory | Italy | France | USA | Argentina |
|---|---|---|---|---|
| A rating + sensitivity | | | | |
| Australia: MA15+: drug use | 66 | 65 | 86 | 83 |
| Australia:MA15+:sex references | 82 | 99 | 80 | 87 |
| Germany:16:strong language | 60 | 52 | 84 | 86 |
| Germany:16:drug use | 89 | 63 | 77 | 82 |
| Germany:16:sex references | 98 | 99 | 88 | 82 |

FIG. 4D

METHOD FOR DYNAMICALLY TRAINING A SYSTEM TO DETERMINE AN AGE RATING OF MEDIA CONTENT

CROSS-REFERENCE TO RELATED APPLICATIONS

This application is a continuation of U.S. patent application Ser. No. 17/666,758, filed Feb. 8, 2022, which claims priority to GB Patent Application No. 2115955.3, filed on Nov. 5, 2021, the contents of each of which are herein incorporated by reference.

FIELD OF TECHNOLOGY

The present disclosure relates to a method of converting an age rating of media content from one country to another.

BACKGROUND

Media content is often classified with an "age rating" that provides guidance on the appropriate audience for that media content. For example, a particular film may be classified as a "15" in the U.K., meaning that it is suitable for audience members aged 15 and above. The process of deciding on a particular age rating in the U.K. takes into account the specific content of the media, such as the degree of violence, use of language, etc., as well as any other cultural sensitivities in the U.K. Sensitivities may be particular words, from a pre-determined list of words, displayed alongside an age rating as additional information relevant to the age rating. For example, in the U.K. words such as "strong violence", "threat" and "bad language" may be displayed as sensitivities alongside a particular age rating. Instead of words or symbols, other formats of displaying sensitivities may be used by different countries. The sensitivities may be explicitly defined and regulated in certain countries, whereas in others, they may not.

While a system for classifying media content in one country can be based on a set of rules, different countries or different cultures may have a different viewpoint. For example, something that is deemed to be offensive in one country may not be deemed to be offensive in another country. As a result, a particular age rating for one country may not be directly mapped to a suitable age rating for another country. Furthermore, even if the viewpoint on the age rating is shared between countries, different countries use different classification systems in that a U.K "15," for example, may not have an equivalent age rating in another country.

Currently, the process of deciding an age rating for a specific country is predominantly a manual process, whereby media is individually classified for each country based on the specific classification system and sensitivities for that country. Not only is this slow and labour intensive, but it can also result in inconsistency and human error. A lack of publicly available data further exacerbates this problem by rendering traditional statistical methods inaccurate since often they rely on learning trends from large amounts of data. There is a need for a quick and efficient process for converting an age rating and/or list of sensitivities from one country to another country.

Because there is no universal committee that determines ratings for all media content (e.g., some local movies in a particular territory may not be given a rating from a committee in a different territory), parental controls are not as effective as they can be on a global scale. Parental control options are commonly part of security/privacy settings in digital platforms such as streaming services. Due to global media consumption, parental control settings may be unable to effectively block restricted content for an audience. For example, a movie on a streaming service such as Netflix that would be blocked in America may be available to the same user if the user travels to Europe (even though it should remain blocked). On the other hand, a movie that should not be blocked (e.g., a PG-13 movie) may be blocked inadvertently. This causes access issues and compromises the effectiveness of parental controls.

SUMMARY

Provided herein is a computer-implemented method of training a system for predicting, based on an age rating of a content item in a source territory, an age rating of a content item in a target territory. The method comprises: obtaining age rating data for a plurality of territories, the age rating data comprising a plurality of age ratings for a respective plurality of content items for the source territory, the target territory and at least one other territory; determining, based on the age rating data, a similarity vector relating to the target territory, the similarity vector comprising a prediction score for each of the source territory and the at least one other territory; determining, for the similarity vector, one or more highest prediction scores; providing, as input data to a machine learning model, the age rating data for the target territory, the territory associated with the highest prediction score, and, when the territory associated with the highest prediction score is not the source territory, the source territory; and training the machine learning model using the input data to provide the age rating for the content item in the target territory.

Optionally, the content item comprises media content.

Optionally, the respective plurality of content items comprises thousands of content items.

Optionally, the at least one other territory comprises a plurality of territories.

Optionally, the step of determining a similarity vector comprises generating a similarity matrix comprising a plurality of similarity vectors for a plurality of pairs of territories.

Optionally, the method further comprises clustering the plurality of similarity vectors into clusters.

Optionally, the step of determining one or more highest prediction scores comprises: (a) selecting one or more prediction scores exceeding a threshold, or (b) selecting a predetermined number of prediction scores having a highest value, or (c) selecting prediction scores within a set number of standard deviations above a mean prediction score.

Also provided is a computer-implemented method for predicting, based on an age rating of a content item in a source territory, an age rating of a content item in a target territory using the trained system. The method comprises providing, as an input to the system, an age rating for a content item in a source territory; and outputting, as an output of the system, an age rating for the content item in the target territory.

Also provided is a computer system comprising one or more processors and one or more non-transitory computer-readable media storing instructions that, when executed by the one or more processors, cause the one or more processors to perform the method.

BRIEF DESCRIPTION OF THE DRAWINGS

Illustrative implementations of the present disclosure will now be described, by way of example only, with reference to the drawings. In the drawings:

FIG. 4A illustrates an example similarity matrix, 4B shows a territory similarity matrix, 4C shows a territory—age rating similarity matrix, 4D shows a territory—age rating+sensitivity similarity matrix.

DETAILED DESCRIPTION

Figure 1:
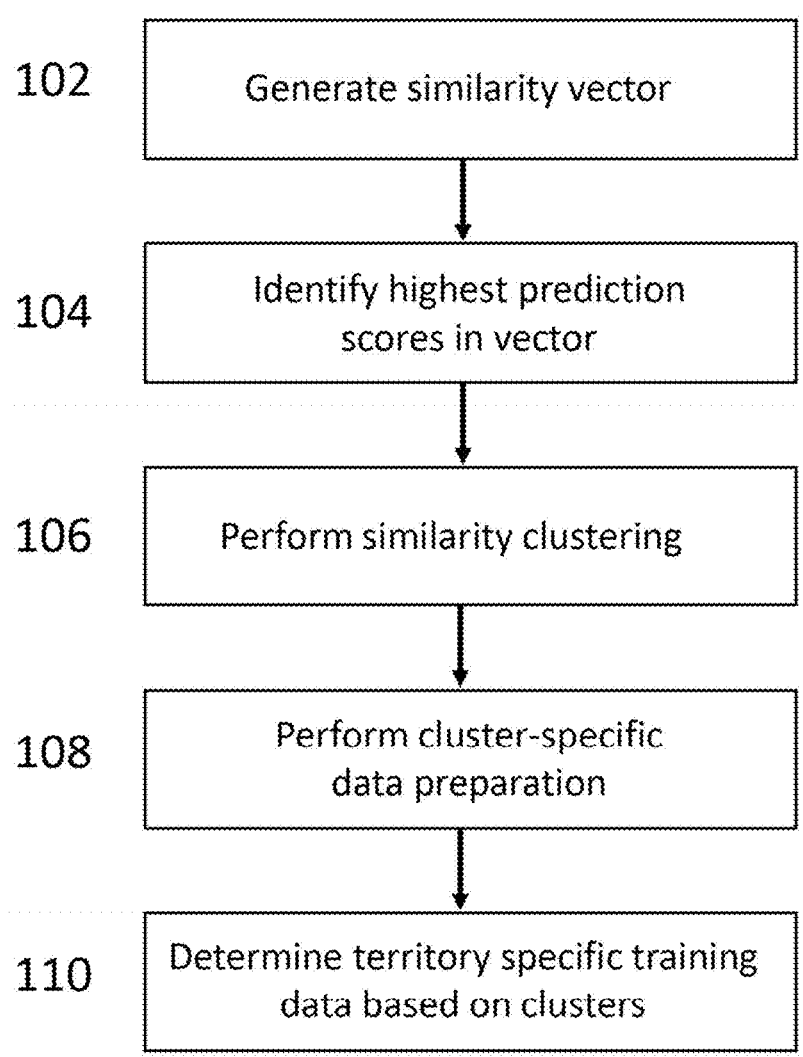
FIG. 1 schematically shows a process of generating training data from raw data for use to train a model to determine age ratings for a target country.

Exemplary In overview, described herein are methods for determining an appropriate age rating for a content item. In this context, content items are any type of media content such as video, audio or picture content. Specific examples are films, documentaries, television programs and the like. These methods are used in the scenario in which it is desired to predict an appropriate age rating for a particular content item in a particular territory, according to the age ratings system of that particular territory. These methods have additional use in predicting appropriate territory specific sensitivities for a particular content item in a particular territory according to the age ratings system of that particular territory.

To determine an appropriate age rating for a particular content item in a particular territory, content data associated with both the particular content item and with a source territory is input into a trained machine learning model. The trained machine learning model has been trained to receive content data associated with both a content item and with a "source territory", and output an age rating for the particular content item in the particular territory. The source territory being a territory for which at least some content data for that particular content item is already known. The content data for the source territory may be, for example, an age rating of the content item. This may be termed a source territory age rating. For example, it may be known that a particular film has a U.K. age rating of 12. In this example, the content item is a film, the source territory is the U.K. and the source territory age rating is 12. Continuing the example, it may be desired to know what the age rating would be for this content item in a target territory, such as France. In other words, it may be desired to know the target territory age rating.

The age rating system of the target territory may not exactly map to the age rating system of the source territory. For example, while the U.K. may be an age rating of "12", in France a "12" may traditionally correspond to a different, higher age rating in the U.K., such as a "15". Even if the age rating systems of the source and target territories are the same, local sensitivities may still mean that what is regarded as a certain age rating on one territory would not be regarded as the same age rating in another territory. Local sensitivities are themes, images, depictions and other criteria which, due to local reasons such as religion or culture, are deemed to be more or less suited to a higher or lower age bracket. For this reason, the process may also include additional content data for the source territory as the starting point, such as text data associated with the content item. Such text data may include at least one of a text description of the content item and a list of sensitivities related to the content item. The list of sensitivities may comprise known sensitivities associated with the source territory, and may optionally or instead comprise one or more custom sensitivities or "tags" for the source territory. Tags are sensitivities associated with the content item that are not necessarily specific to the source territory, but may however be impactful in another territory. For example, certain territories may regard "national conflict" as an impactful sensitivity whereas the U.K. does not. "National conflict" would not traditionally be a sensitivity associated with a content item if the source territory was the U.K. (due to having limited or no impact on a U.K. age rating), however, if the content item contained "national conflict", the source territory may still carry the tag "national conflict" as an additional sensitivity. Such tags may therefore be part of age rating data to improve the training of a machine learning model, since sensitivities that only affect some territories may nevertheless be included in the age rating data for other territories.

The processes described herein enable an accurate and automatic determination of an appropriate target territory age rating for a specific content item based on known content data for a source territory. To achieve the accurate and automatic determination of an appropriate target territory age rating, one or more machine learning models are trained to predict the target territory age rating.

Before training the one or more machine learning models, the raw data is pre-processed. The raw data may be obtained from any appropriate source such as publicly available databases or data supplied from third parties. The raw data comprises raw data from a plurality of territories. For example, the raw data may comprise raw data from territory A and raw data from territory B. Territory A may be used as the source territory in inference, and territory B may be the target territory in inference. In this case therefore, the raw data is processed to create training data for training a machine learning model to output a target territory age rating for a target territory B based on input content data of a source territory A. In an example, the raw data includes a list of all territory A age ratings for which territory B age ratings are known for a particular content item. Such territory A and B age ratings in this raw data are known due to previous methods of determining such age ratings, such as manual methods. Optionally, the raw data further includes any territory A sensitivities and any territory B sensitivities for all the content items in the dataset. It should be noted that in some cases, territories do not carry a sensitivity associated with an age rating. Variants or combinations of these examples are of course possible and it is understood that these examples are used for illustrative purposes.

The raw data is pre-processed to present the raw data in vector form. Pre-processing comprises encoding the raw data. Age ratings of each content item may be encoded using one-hot encoding, the text description of each content item may be encoded using Term Frequency-Inverse Document Frequency (TF-IDF) encoding, and the list of sensitivities of each content item may be encoded with categorical encoding. Alternative known encoding methods could also be used in order to represent the raw data in vector form, as would be understood by the skilled person, and the exact encoding method is not essential.

The resulting encoded vectors are concatenated into a single encoding vector for each territory associated with each content item. Pre-processing may further comprise additional known natural language processing techniques such as stop word removal, stemming and data cleaning to remove duplications and abnormalities. Furthermore, the pre-processed data may be up-sampled to increase the amount of data. In this case, the amount of "recent" data is increased. This involves the duplication of content items such that there is a higher probability that more "recent" content items are duplicated. For example, more weight may be placed on content items created within a certain time threshold, for example within the last two years. Beneficially, the up-sampling of more recent data compensates for the problem arising due to classification criteria changing over time and ensures the model can accurately determine age ratings according to more recent classification criteria.

In one implementation, a machine learning model is trained using the pre-processed data from only two territories: A and B. When the amount of training data for territories A and B is high (e.g., above a threshold size), this model can accurately predict the age rating in territory B for a particular content item. Such a prediction is based on an input comprising content data associated with both the particular content item and with territory A. A high amount of training data may be upwards of 5000 content items, for example. In another implementation, a machine learning model is trained to accurately predict sensitivities for the particular content item in territory B. Such a prediction is also based on an input comprising content data associated with both the particular content item and with territory A. Whilst a prediction accuracy of over 80% is achieved with large amounts of data, both model implementations become less effective as the amount of data decreases. Furthermore, since the requirement for such a model arises partially from the lack of age-rating data for content items in other territories, typically, there is insufficient data to train the implementations described above to produce accurate age rating or sensitivity data for target territories.

Further modifications to the pre-processed data solve the problem of insufficient publicly available data, allowing accurate predictions to be achieved even with small amounts of training data. In addition, even when high amounts of data are available, these modifications further increase the accuracy of the machine learning model, allowing age ratings to be predicted with over 90% accuracy for target territories.

FIG. 1 schematically depicts a process 100 of generating training data from data pre-processed as described above. Such training data is used to train a machine learning model to output a target territory age rating for a content item, based on input content data of a source territory for the content item. Process 100 can be implemented by any kind of general computer or computing device and is specifically suited for computers with a processing capacity adapted for machine learning processes.

In step 102, similarity vectors are determined. Similarity vectors are made up of two or more prediction scores. Based on the pre-processed data, a prediction score may be calculated to quantify how well an age rating in territory B can be predicted from the appropriate age rating in territory A. For example, for a particular film content item, the raw data includes that the age rating in the U.K. (territory A) is "12", whereas the age rating in France (territory B) is "TP". The prediction scores may further quantify whether these predictions can be improved when sensitivities are taken into account. The pre-processed data includes a number of examples such that a dataset of particular content items and their respective age ratings in both territories is provided.

Figure 2:
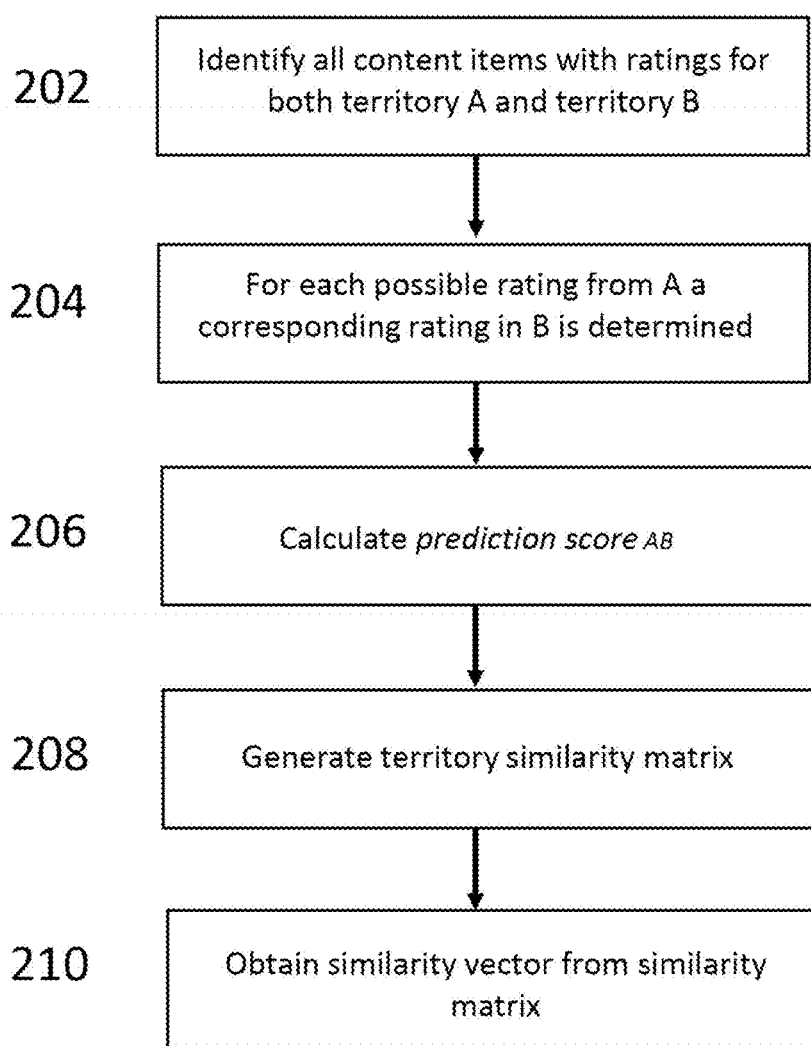
FIG. 2 schematically shows a process of generating prediction scores for the similarity clustering.

A process 200 for determining the similarity vector in step 102 of FIG. 1 will now be described with reference to FIG. 2. It is noted that, although FIG. 2 describes the process of generating territory similarity vectors, the process described in FIG. 2 may also be used to generate additional types of similarity vectors as described in more detail below. The prediction scores are generated pairwise such that for each pair of territories A and B, a score is generated. In order to generate a prediction score for territories A and B, all content items (e.g. specific films) that have previously-determined age ratings for both territories A and B in the pre-processed data are identified in step 202.

In step 204, for each different age rating from territory A, a most frequently occurring age rating in territory B is determined. The pre-processed data may not be a 1:1 mapping of age ratings between different territories. This may be for various reasons. For example, territory A may have an age rating system comprising a first number of possible different age ratings "n" for content items (e.g. 8), whereas territory B may an age rating system comprising a second, different number of possible different age ratings for content items (e.g. 6). Therefore, a most frequently occurring ("MFO") age rating for territory B determined for each territory A age rating. This will be explained further in relation to FIG. 3.

Figure 3:
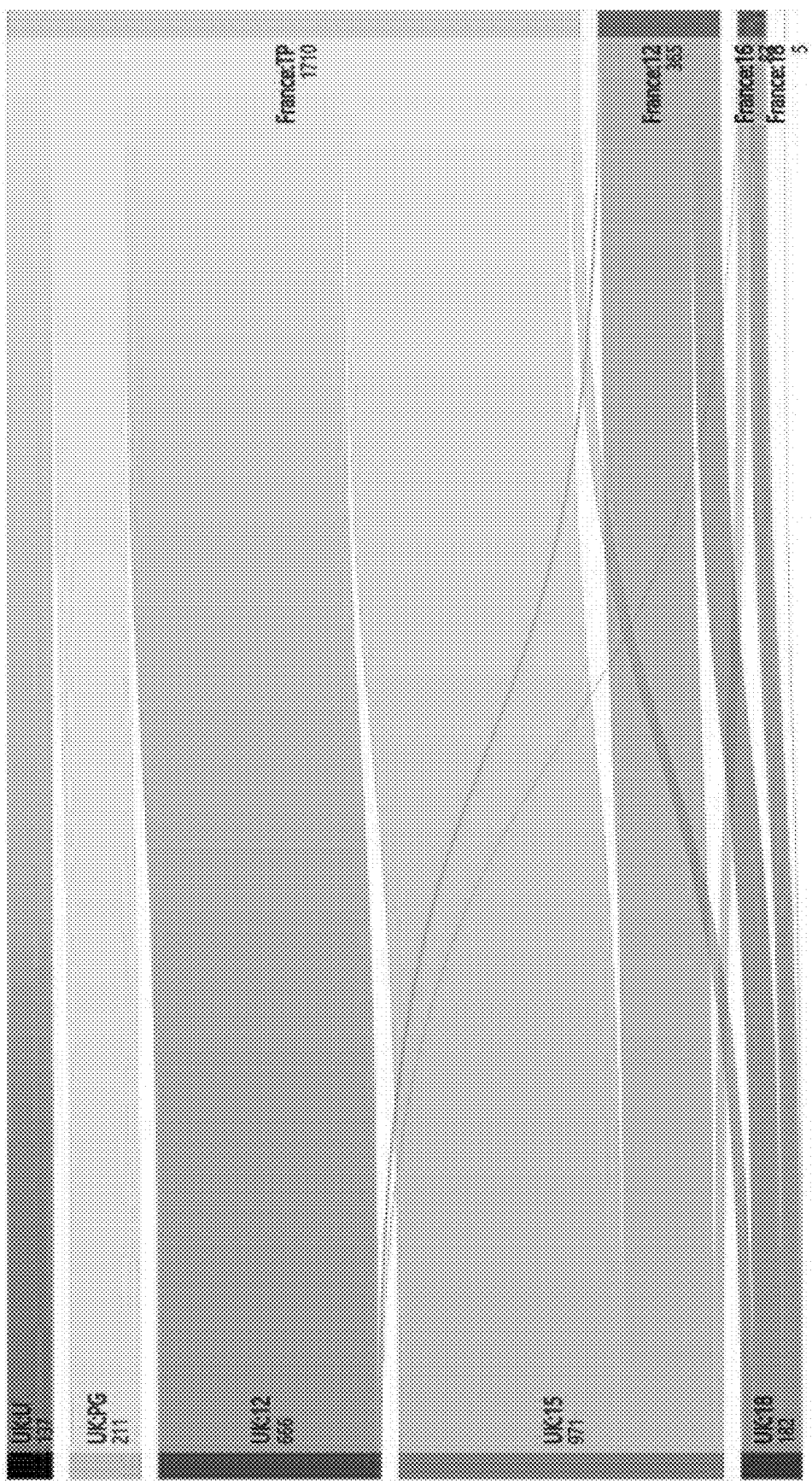
FIG. 3 illustrates the relationship between the ratings in the U.K. and France.

FIG. 3 shows an example mapping of age ratings between two different territories. As is clear in the context of the described examples, "mapping" may refer to the correlation of the content, based on metadata and source territory age rating, to a destination territory's age rating. In this example, the left side of the graph represents territory A (U.K.) and the right side of the graph represents territory B (France). As can be seen, most, but not all, of the content items having an age rating of "12" in the U.K. have an age rating of "TP" in France. In the specific example of FIG. 3, 656 out of 666 U.K. "12" age ratings in the pre-processed data correspond to an age rating of "TP" in France, whereas 10 out of 666 U.K. "12" age ratings correspond to other age ratings in France, such as "12" or "16". Thus, "TP" is the most frequently occurring age rating in France for a "12" age rating in the U.K., and therefore "TP" is regarded as the most frequently occurring age rating in France for the age rating "12" in the U.K.

Similarly, it can be seen that most of the content items having an age rating of "15" in the U.K. also have an age rating of "TP" in France. In the specific example of FIG. 3, 671 out of 971 U.K. "15" age ratings in the pre-processed data correspond to an age rating of "TP" in France Thus, "TP" is also regarded as the most frequently occurring age rating in France for the age rating "15" in the U.K.

Returning to FIG. 2, in step 206, for each of the n different age ratings for territory A, the number of content items corresponding to their most frequently occurring age rating in territory B is summed and divided by the total number of content items—this is the prediction score$_{AB}$ as shown below in equation 1.

$$\text{Prediction score}_{AB} = \frac{(\text{A\_AgeRating 1}_{MFO} + \text{A\_AgeRating 2}_{MFO} \ldots + \cdots \text{A\_AgeRating n}_{MFO})}{(\text{A\_AgeRating 1}_{total} + \text{A\_AgeRating 2}_{total} \ldots + \cdots \text{A\_AgeRating n}_{total})} \quad (1)$$

Where A_AgeRating $1_{MFO}$ to A_AgeRating $n_{MFO}$ are, for each of the 1–n different age ratings in the age rating system of territory A, the number of content items that correspond to their most frequently occurring age rating in territory B, and where A_AgeRating $1_{total}$ to A_AgeRating $n_{total}$ are the total number of content items having each age rating of territory A. Using the example discussed above for the U.K. and France, the prediction score is calculated by summing, for each of the different U.K. age ratings, the number of U.K. age ratings that corresponds to their respective most frequently occurring France age rating, and dividing that sum by the total number of content items in the pre-processed data that have both France and U.K. age ratings.

In this example, this is $(656+671+\ldots)/(666+971+\ldots)$. Although the above example has only described the scenario of U.K. "12" and U.K. "15" age ratings, the process would be completed for all U.K. age ratings, as represented by the " . . . " in the formula. The outcome is a decimal number between 0 and 1 representing a percentage of how well a U.K. age rating predicts an age rating in France, where 1 indicates 100% correspondence of all age ratings.

In step 208, a territory similarity matrix is generated from the prediction score for each pair of territories.

FIG. 4A shows an example of a generic matrix, H with m rows and n columns. Each element $h_{ij}$ describes the element in the ith rows and the jth column where i takes any value from 0 to m and j takes a value from 0 to n.

FIG. 4B shows an example of a territory similarity matrix having the structure of FIG. 4A, where each element $h_{ij}$ describes how well a rating in territory $T_j$ is predicted by the rating in territory $T_i$. Territories A and B, previously described, would be examples of one of the territories $T_i$ and $T_j$ respectively. The first column can be interpreted as follows: All age ratings of a content item in Argentina (1.00) correspond to their most frequently occurring age rating in Argentina (exact correspondence), 68% (0.68) of all age ratings in Australia correspond to their most frequently occurring age rating in Argentina, 50% (0.50) of all age ratings in Austria correspond to their most frequently occurring age rating in Argentina, 48% (0.48) of all age ratings in Brazil correspond to their most frequently occurring age rating in Argentina. Each element of each column of the territory similarity matrix therefore describes how well a particular territory $T_i$ predicts the age ratings of the particular territory $T_j$ corresponding to that column. Thus, each column is referred to from hereon as the similarity vector for that column's territory. For example, the first column of FIG. 4B shows the similarity vector of Argentina being [100, 68, 50, 48] describing how well other countries predict the age rating in Argentina. In step 210, similarity vectors are obtained from each column of the similarity matrix.

Returning to FIG. 1, after the matrix of prediction scores has been generated in step 102, as described above, in step 104, the highest prediction scores in each column are identified. These scores indicate the territories that best predict the territory $T_j$ of that column. The best predicting territories may be selected by an appropriate indicator, for example, by using a threshold value for the prediction score, such as 90%. Alternatively, the top 3 territories may be selected, or the territories with prediction scores of a set number of standard deviations above the mean prediction scores for that column. These territories are then used to train a common part of the machine learning model for that territory $T_j$, as described below in more detail with reference to FIG. 6. If the predictive accuracy of the model trained using this data is high, for example over a particular threshold, steps 106-110 may be discarded.

Alternatively, a higher accuracy may be obtained using steps 106-110. In step 106, the similarity vectors obtained from each column of the territory similarity matrix are clustered into clusters. These clusters group territories that are predicted by similar combinations of territories. In the described embodiment, trial-and-error is used to determine which clustering techniques provide the best results. For example, one clustering technique may be used and, depending on the accuracy of the outcome from the trained model, another clustering technique may be used. This process may be repeated to find the most accurate clustering method. For example, top K and K-means clustering may be used.

Figure 5:
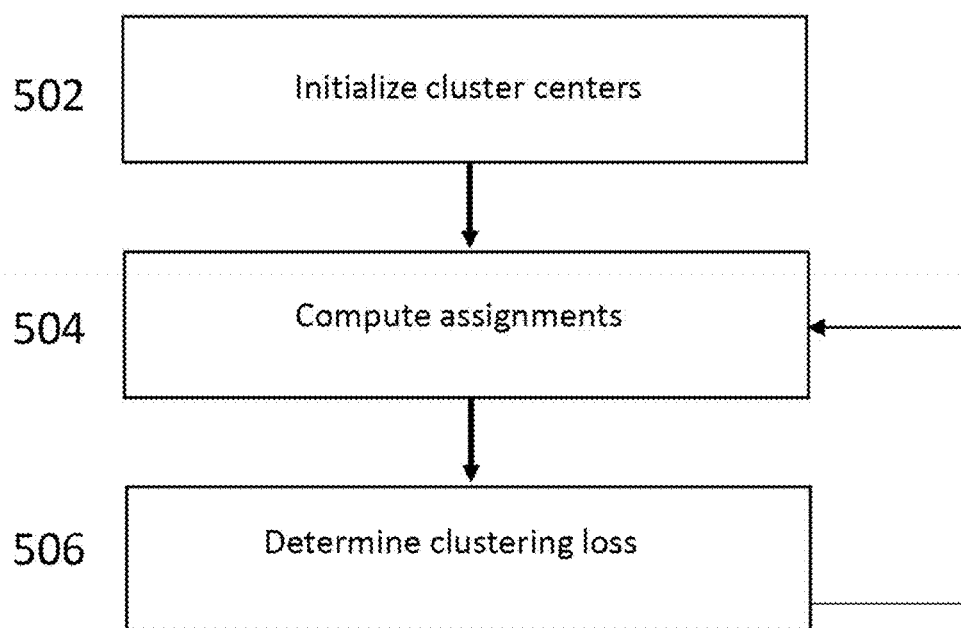
FIG. 5 schematically shows a process of clustering.

FIG. 5 schematically shows a general process of clustering. It is understood that any appropriate clustering technique could be used in addition to or instead of the techniques described above. The clusters obtained in step 106 comprise the combination of territories used to train the machine learning model to determine age ratings for a target territory. The combination of territories may be any combination of territories, and not merely the examples described above. The term "clusters" as used in this specification refers to two or more clusters (groups) generated from a process of clustering three or more vectors. In step 502, the cluster centres are initialised. In step 504, assignments to the clusters are computed. In step 506, the loss is determined. The clustering process 500 iterates between steps 504 and 506 in order to minimise the loss until some pre-determined threshold is reached.

Each of the resulting clusters is a group of territories predicted by similar combinations of territories. The territories with the highest prediction scores for territory $T_j$, obtained from step 104, are added to the cluster in which the vector obtained from territory $T_j$ is grouped. The resulting cluster is a cluster of territories that either predict territory $T_j$ or are predicted by similar territories to territory $T_j$ (are similar to territory $T_j$).

In step 108, cluster-specific data preparation is performed. For each cluster from step 106, the territory with the largest number of content items is identified and the content items in the other territories in the cluster are up-sampled, so that each territory has the same number of content items as the territory with the largest number of content items. For example, say the similarity cluster for Argentina includes: France with 10 content items, Brazil with 5 content items and Australia with 7 content items. In this case, the content items in Brazil and Australia are up-sampled so each territory in the similarity cluster for Argentina has 10 content items.

As described above in the pre-processing section, up-sampling comprises the duplication of territory content items. Following the above, 3 content items from Australia may be randomly selected and these content items duplicated, and 5 content items from Brazil may also be randomly selected and duplicated. The result is that each territory of the similarity cluster now contains 10 content items. Alternative methods of up-sampling, such as generating content items that represent a combination of the data from other content items from a certain territory could also be used.

In step 110, the resulting cluster may be used to train the machine learning model. Should it be desirable to further increase model accuracy, the cluster may be added to by performing process 200 in order to obtain additional similarity matrices and therefore additional similarity vectors. After every addition to the cluster, the model is retrained and the accuracy of the model obtained in order to find the combination of territories that produces the most accurate model for each territory.

Obtaining additional similarity matrices is particularly useful when the territory prediction score between two territories is low or when the trained model gives a low accuracy of result for example, under 80% accuracy of model). For each additional matrix, prediction scores are generated as per the process described above with reference to steps 202-210 but with the differences described below.

A first additional similarity matrix, an territory-age rating similarity matrix, provides insight into whether a particular territory $T_i$ age rating corresponds to a specific territory $T_j$ age rating despite the total percentage of age ratings corresponding to their most frequently occurring age rating in territories $T_i$ and $T_j$ being low. For example, only 40% of the content items in Columbia have age ratings corresponding to their most frequently occurring age rating in Germany, but there is a specific age rating in Columbia where 80% of the examples of that age rating correspond to a German:16. As described above with reference to step 106, any additional similarity matrices may be used in clustering. Furthermore this information may be used later on when including optional adding hard coded rules to the trained machine learning model.

Each element $h_{ij}$ describes how well a particular rating (specified in the matrix) in territory $T_i$ predicts a rating in territory $T_j$. Territories A and B, previously described, would be examples of one of the territories $T_i$ and $T_j$ respectively. FIG. 4C shows an example of a territory-age rating similarity matrix. The first column of FIG. 4C indicates that 69% of the examples of age rating MA15+ in Australia have a corresponding age rating in Italy, 100% of the examples of age rating 12A in Ireland have a corresponding age rating in Italy, 60% of the examples of age rating 16 in Germany have a corresponding age rating in Italy and so on. This shows that there is an age rating in Italy that is perfectly predicted by both Ireland: 12A and a rating in Italy that is perfectly predicted by Hong Kong: 11A. Therefore, it is likely that the addition of these territories to the similarity cluster used to train the model for Italy may improve the accuracy of the model.

A second additional similarity matrix indicates the prediction score when particular sensitivities are associated with a specific age rating. This provides a further level of detail and indicates the similarity between combinations of age ratings and sensitivities FIG. 4D shows an example of a territory-age rating+sensitivity similarity matrix. The first column of FIG. 4D indicates that 66% of the examples of age rating MA15+ in Australia that have drug use have a corresponding age rating in Italy, 82% of the examples of age rating MA15+ in Australia that have sex references have a corresponding age rating in Italy, 60% of the examples of age rating 16 in Germany that have strong language have a corresponding age rating in Italy and so on. Again, particularly high prediction scores here can also be used to choose specific territories to add to the similarity cluster used to train the model for a particular territory.

Figure 6A:
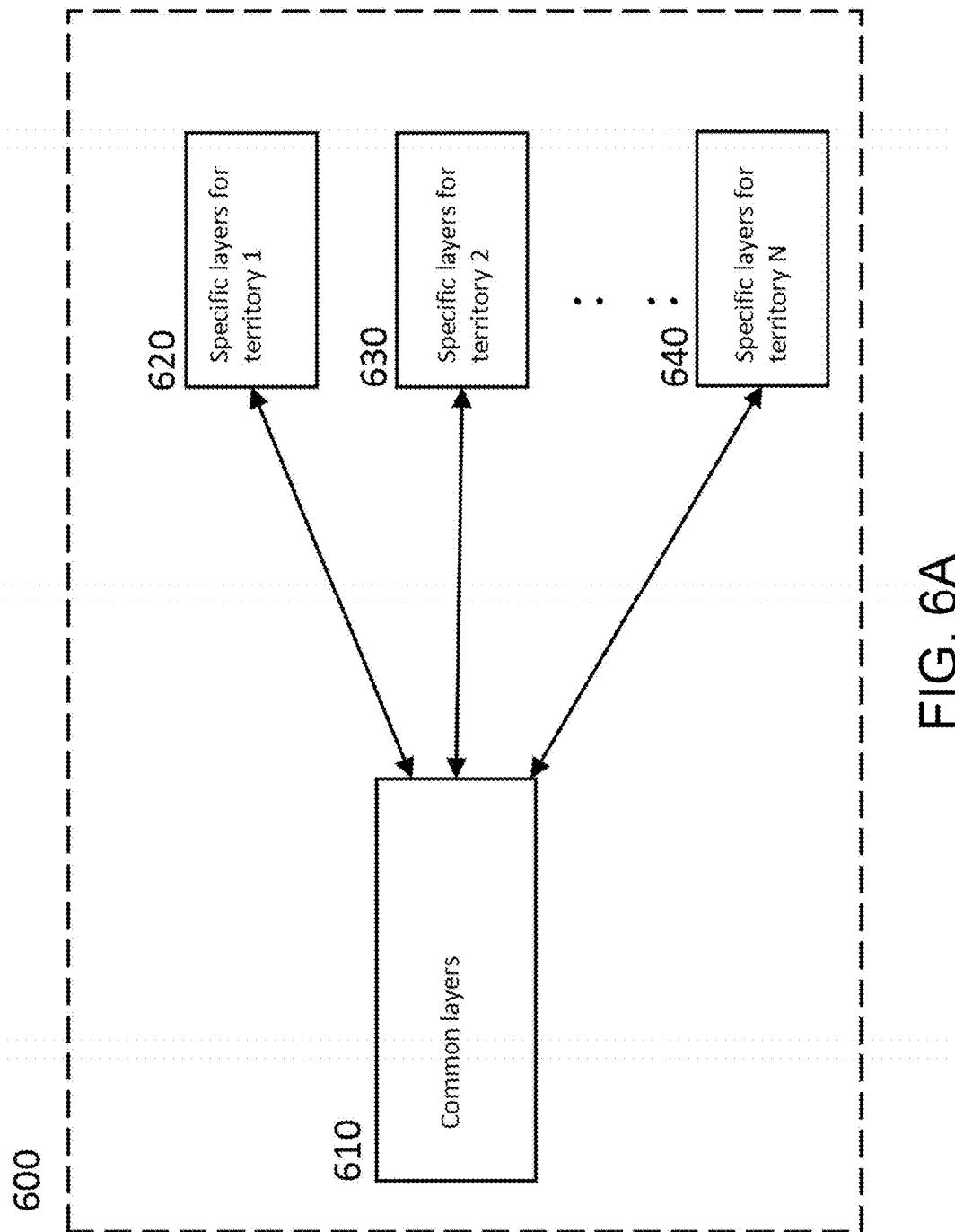
FIG. 6A shows a high-level architecture of a multitask learning model, 6B shows a model trained for territory 1, 6C shows an example architecture of multitask learning model 6A.

FIG. 6A shows a high-level architecture of a multitask learning model 600. As this skilled person would understand, multitask model is a term used in the art to describe a machine learning model in which multiple learning tasks are solved at the same time, while exploiting both the commonalities and differences across tasks. The multitask learning model may comprise two parts: an optional first part comprising common layers (610) and a second part comprising specific layers (620, 630, 640). As described above, the implementation of the model which does not require the steps 102-110 described in FIG. 1 due to a high or sufficient initial model accuracy, which is specifically trained with two territories only, does not require a common part and is trained purely with the territory specific data.

The first part is made up of layers of the network which are shared between all the territories in a cluster and trained to minimise the loss over all the shared territories. A source territory is provided in addition to the territories in the cluster for training. Here, the cluster is obtained in the process described above with reference to FIGS. 4A-5. The specific part is made up of layers of the network which are trained only to predict the most accurate rating for the specific territory $T_j$. It is this specific part which outputs the prediction for the model. There may be any number of specific layers for territories 1 to N. For example, a cluster of N territories is obtained using the process described above. Element 620 comprises territory 1 specific layers and makes up the second part of a multiclass model for territory 1, element 630 comprises territory 2 specific layers and makes up the second part of a multiclass model for territory 2, and element 640 comprises territory N specific layers and makes up the second part of a multiclass model for territory N. The resulting model for each territory comprises (1) common layers trained using the territories in the territory specific cluster, and (2) territory specific layers for that territory.

Figure 6B:
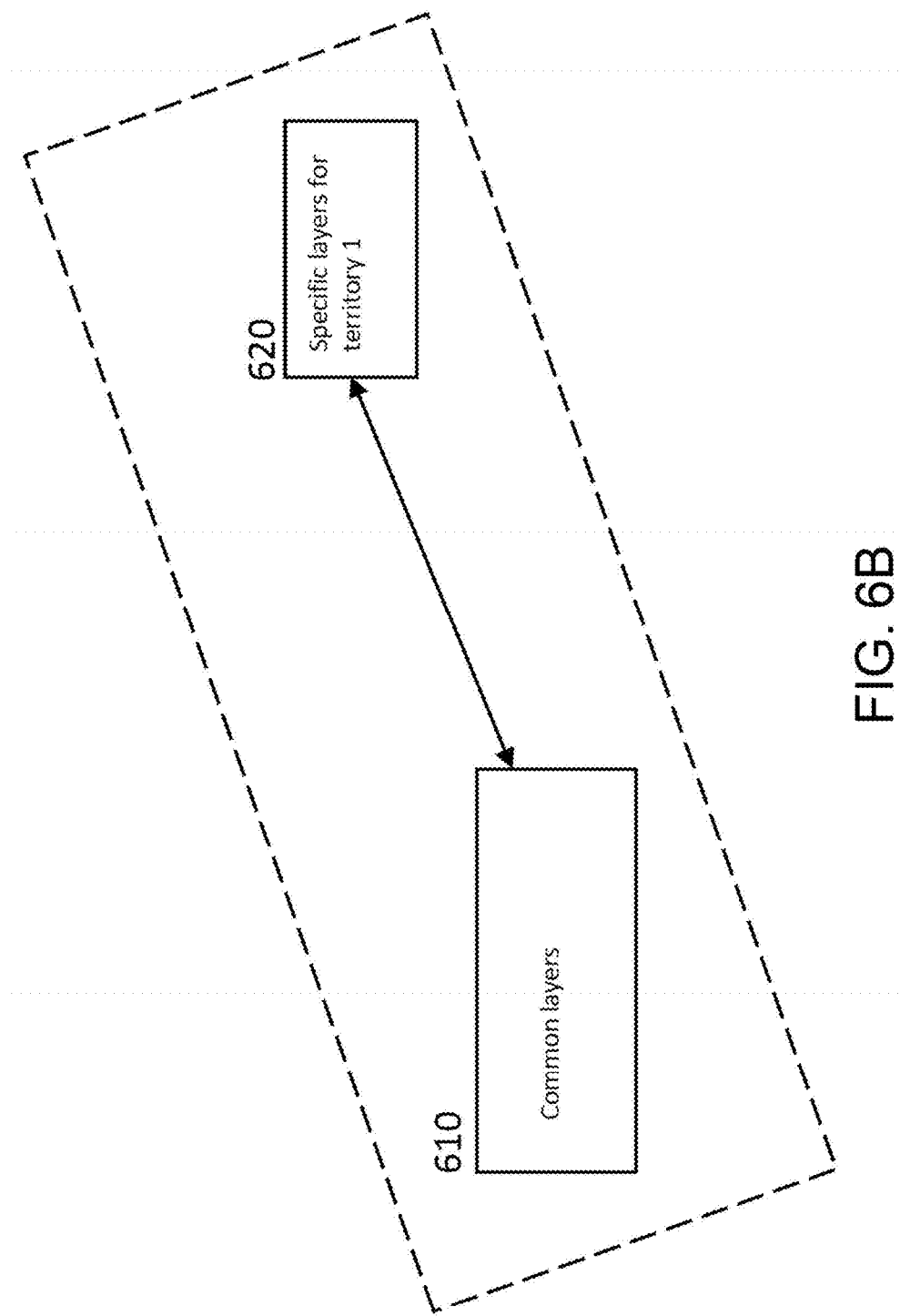

FIG. 6B shows an example model trained to provide a prediction for territory 1. FIG. 6A describes an implementation where at least some of, and possibly all of, the steps described in FIG. 1 were performed to obtain additional territories for training the model. It is understood that in an implementation where these steps are not performed, the model. only comprises specific layers for a particular target territory and is trained on data relating to the source and target territory such that the model is trained to predict an age rating or list of sensitivities for the target territory given only information about the source territory as an input.

Figure 6C:
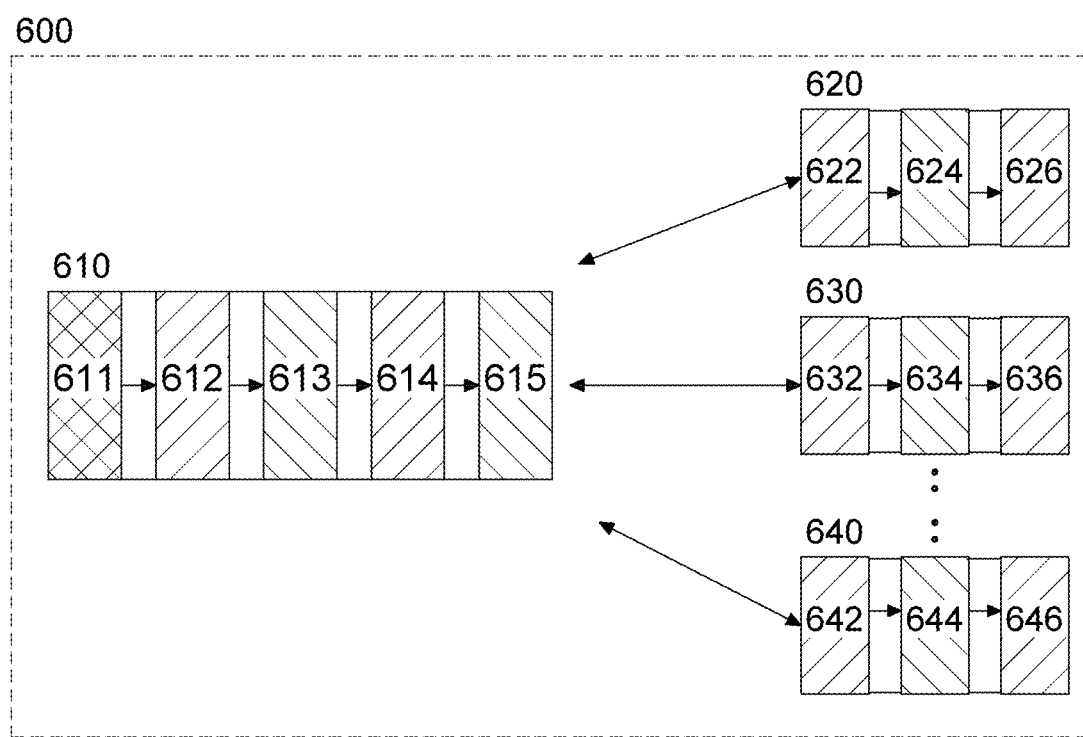

FIG. 6C shows an example architecture of the multitask learning model 600 described above with reference to FIG. 6A. In the specific implementation summarised by FIG. 6C, each part of the multitask learning model 600 comprises one or more layers.

The first part comprises an input layer 611 followed by alternating dense (first and second dense layers) layers 612, 614 with ReLu activation function and MaxNorm kernel constraint of 3, and dropout (first and second dropout layers) layers 613, 615 with dropout rate of 0.2 (20%), on a scale from 0 to 1 where 0 indicates no dropout and 1 indicates no output from the layer.

The terms dense layer may also be referred to in the art as fully connected layer and is only briefly described here for the sake of brevity. Dense layers or fully connected layers refer to layers where all the neurons in the previous layer are connected to all neurons in the next layer. Dropout layers are layers that ignore a number of neurons in the output which has the effect of making the layer act like a layer with a different number of neurons to the prior layer. An effect of using dropout layers is that neurons in a layer are prevented from synchronously optimizing their weights, which is known to overcome the common problem of overfitting in machine learning.

The second part comprises a third dropout layer with dropout rate of 0.5 (50%) in between a third and fourth dense layer, the third dense layer with ReLu activation and MaxNorm kernel constraint of 5 and the fourth dense layer with Softmax activation function to generate the final prediction. The terms activation, ReLu, Softmax, kernel and MaxNorm are known in the art and are as would be understood by the skilled person.

Although the described implementation describes the same architecture in each of the specific parts, it should be understood that each specific part may have entirely different architecture and the architecture that provides the highest accuracy for each specific territory is chosen. For example, some territories may produce higher accuracy with very complex models and some with simple models.

The multitask learning model 600 may be trained to determine age ratings for a target country or sensitivities for a target country.

The age rating prediction model is trained to predict the age rating that a content item will have in the target territory for a given the input vector for a specific content item obtained from a source territory. The model outputs a probability of the content item being in each age rating for the target country. The highest probability is used for the actual prediction. For this model, all the similarity vectors obtained from the matrices in FIGS. 4B-4D may be used in obtaining the territories for training the common layers of the model.

The sensitivity prediction model is trained to predict the list of local sensitivities for the target territory given the input vector for a specific content item. This model performs a multi-label classification and can predict multiple sensitivities that apply for the example.

The age rating prediction model is trained to minimise the Categorical Cross-entropy loss function. The Categorical Cross-entropy loss function minimises the difference between the target value $y_i$ and the model output, $\hat{y}_i$ as described in equation 2:

$$\text{Loss} = \Sigma_{i=1}^{n} y_i \log(\hat{y}_i) \quad (2)$$

where n is the total number of categories, for example age ratings, in the model output. An Adam optimiser is used for gradient descent.

The sensitivity prediction model is trained to minimise the Binary Cross-entropy loss function. A specific implementation may therefore use a Sigmoid activation function in the last layer of the model, instead of the Softmax activation described above with reference to the age rating prediction model. However, it is understood that any activation function compatible with a binary cross entropy may also be used.

The Binary Cross-entropy loss function minimises the difference between the target value $y_i$ and the model output, $\hat{y}_i$, where each sensitivity, m can have one of two values, 0 or 1, indicating whether or not they are applicable to a particular content item, as described in equation 3:

$$\text{Loss} = -\frac{1}{m}\Sigma_{i=1}^{m} y_i \log(\hat{y}_i) + (1-y_i)\log(1-\hat{y}_i) \quad (3)$$

The multitask model of FIG. 6A is trained for a specific territory by training both the common and specific parts of the model iteratively for each of the territories in the similarity cluster for that specific territory. For example, in a single epoch the model trains the common part and the specific part for territory 1 by going once over all the content items in territory 1, in the next epoch the model trains the common part and the specific part for territory 2 by going once over all the content items in territory 2, in the $n^{th}$ epoch, the model trains the common and specific part for territory n by going once over all the content items in territory n and the process is repeated until the a accuracy threshold is met or the optimal accuracy is reached.

This results in a model that learns from territories that are similar to the target territory, not just the target territory since the common part of the model is updated based on its ability to predict the age rating for each of the territories in the cluster, not just the target territory. Beneficially, this approach effectively increases the amount of data available to the model for training. As such, this approach solves the problem of providing high prediction accuracy when the amount of raw data for the target territory itself is otherwise insufficient. After training, the specific parts generated for the other territories in the cluster are discarded, leaving only the common part and the specific part for each territory for use in inference.

Optionally, manual rules may be applied and used in conjunction with the trained multitask learning model. The manual rules reflect known information on the classification methods in different countries, which may modify or override the prediction of the trained machine learning model.

Figure 7:
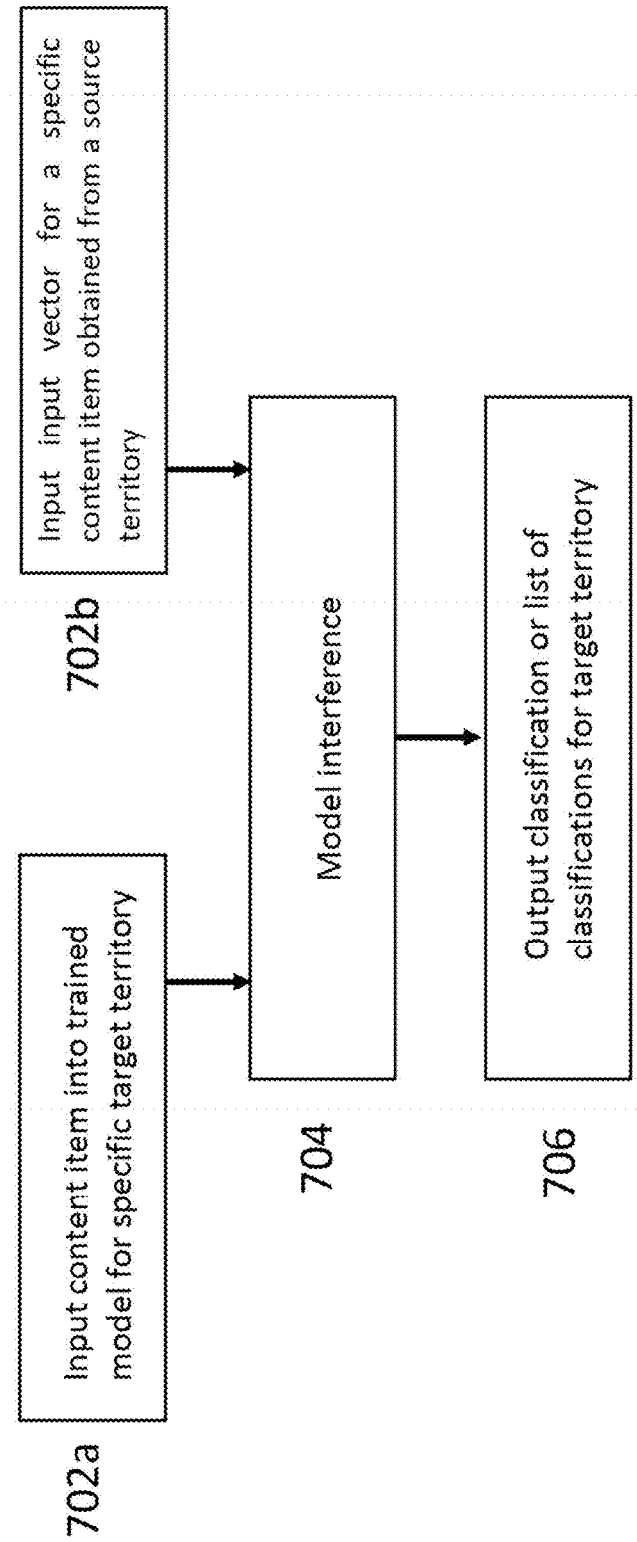
FIG. 7 schematically shows a process of determining age ratings for a target country.

Age ratings and sensitivities of the target territory can be obtained from the appropriately trained model by the method described in FIG. 7. Taking the age rating prediction model as an example, in step 702a, the content item for which an age rating is to be determined is provided as input to the age rating prediction model trained for the target territory.

In step 702b, the data describing that content item, relating to a source territory, is input into the model. This data may be manually provided by the user as raw data, obtained from a third party as raw or encoded data or obtained from a database in the system (described below with reference to FIG. 9) in the encoded vector form described above in the pre-processing step. The data describing the content item is encoded into a vector, if not yet in vector form, and in step 704 is provided to the trained model for inference. In step 706, the model outputs an age rating classification for the content item in the target territory.

The above-described methods provide various advantages. Such methods provide an accurate and efficient manner of predicting an appropriate age rating for a particular content item in a particular territory. As the method relies on a trained machine learning model that has been trained using age rating data for a plurality of territories, the method takes into account not only data from a source territory and a target territory, but also at least one other territory which may provide more accurate age rating predictions for the target territory. Including additional territories in this manner greatly improves the accuracy of the method and provides a prediction accuracy that is otherwise not possible using manual techniques. Beneficially, the automation of the prediction removes human error in determining an age rating for the target territory, as only the age rating for the content item in the source territory is needed as an input to the trained model.

Further, the method is effective in the scenario where age rating data for a particular target or source territory is limited. This is because the method makes use of data not only relating to the target and source territory, but also relating to at least one other territory. As such, the age rating data from multiple territories comes together as part of the model to, in aggregate, provide a large data size for predicting an appropriate age rating in the target territory. Another benefit of the described methods is that appropriate sensitivities, and not just age ratings, may also be predicted automatically.

Because the system generates training datasets based on the prediction scores, the machine learning model trained on the custom-built training datasets is more accurate. For example, in response to determining that the territory associated with the highest prediction score is not the source country, the system may generate a training dataset comprising the age rating data for: the target territory, the source territory, and the territory associated with the highest prediction score. Here, the territory associated with the highest prediction score may serve as an intermediary territory. For example, there may not be enough data to accurately map age ratings between the source territory and the target territory. However, the intermediary territory may have a more accurate mapping of age ratings with the source territory and the target territory (evidenced by the prediction score). A training dataset that includes all three territorial age rating data is generated to allow, on a high level, a mapping from the source territory to the intermediary territory and then a mapping from the intermediary territory to the target territory. On the other hand, the system may determine that the territory associated with the highest prediction score is the source country, and may generate the training dataset using the age rating data for only the target territory and the source territory. The benefits of a more focused training dataset include faster training times, fewer false positives, and less use of storage.

Subsequent to successfully training the machine learning model, the model can be used for a variety of tasks. For example, ratings committees from different territories can execute the machine learning model to received age rating conversion recommendations. Because the training dataset of the machine learning model accounts for age rating data from a plurality of territories, each with their own ratings committee, the machine learning model's recommended output can push age ratings to be more consistent across different territories.

In another aspect, the machine learning model may be used to implement parental controls in different territories. For example, media content platforms such as streaming services and cable often provide parental control options to restrict content from being viewed (e.g., prevent children from viewing violent movies). Suppose that a user accesses a streaming service that is available in different parts of the world or provides access to movies/shows from different parts of the world (i.e., the media content platform is accessible in a source territory and a target territory). A user may be interested in viewing a local movie that has a "18" rating in the U.K. and has not been rated in France. The user may be accessing a version of the streaming service associated with France (e.g., while in France or while using a virtual private network (VPN) in a different country to access content in France). The parental control threshold may be set in a ratings scale associated with France. For example, the parent control threshold may be set to "TP" such that all other movies/shows are blocked. Here, the U.K. rating "18" cannot be directly compared to the France-based parental control threshold and needs to be converted.

A system (e.g., a parental control module of the media content platform) can be provided that is configured to determine, by executing the trained machine learning model, that the input content item (e.g., the local movie being requested for access) has a first age rating in the target territory (e.g., "12" rating in France), wherein the first age rating (e.g., "12") corresponds to a second age rating of the input content item in the source territory (e.g., "18" in the U.K.). In response to determining that the first age rating (e.g., "12") exceeds a parental control threshold (e.g., "TP"), the system may generate an alert indicative of a parental control when the input content item is requested for access. In some aspects, the alert is generated on a graphical user interface of the media content platform. For example, the alert may warn the user that he/she is attempting to access restricted content. In some aspects, subsequent to generating the alert, the system may block the request to access the input content item to fully execute a parental control.

Because the parental control threshold and the first age rating are set in a first rating scale of the target territory, and the second age rating is set in a second rating scale of the source territory that is incompatible for direct comparison with the parental control threshold, the execution of the machine learning model is necessary. Otherwise, movies that cannot be compared with the parental control threshold may be accessible when they should not be, or movies that should be accessible may be prematurely blocked to avoid parental control threshold issues.

Figure 8:
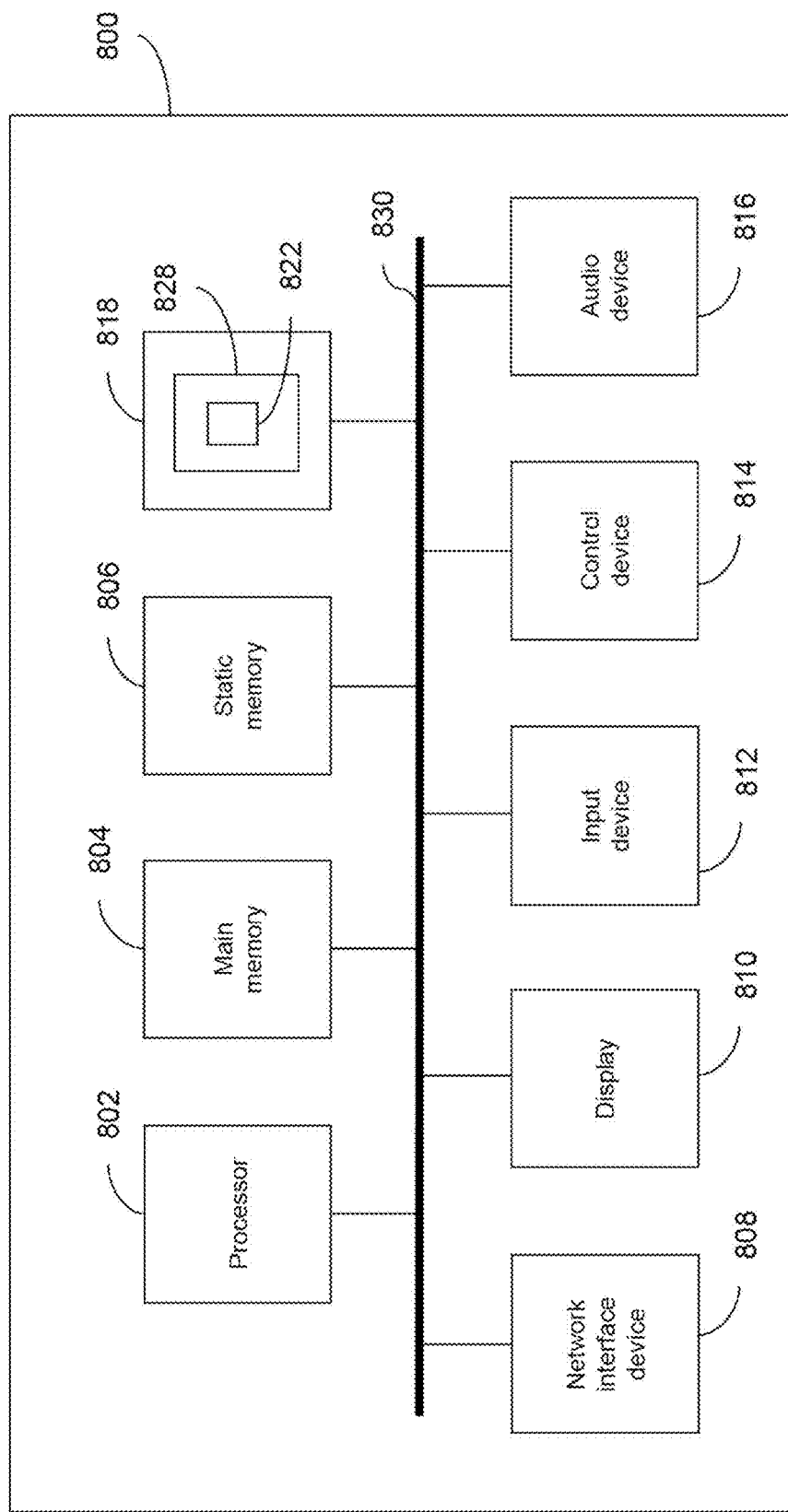
FIG. 8 illustrates a block diagram of one implementation of a computing device.

FIG. 8 illustrates a block diagram of one implementation of a computing device 800 within which a set of instructions, for causing the computing device to perform any one or more of the methodologies discussed herein, may be executed. In alternative implementations, the computing device may be connected (e.g., networked) to other machines in a Local Area Network (LAN), an intranet, an extranet, or the Internet. The computing device may operate in the capacity of a server or a client machine in a client-server network environment, or as a peer machine in a peer-to-peer (or distributed) network environment. The computing device may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single computing device is illustrated, the term "computing device" shall also be taken to include any collection of machines (e.g., computers) that individually or jointly execute a set (or multiple sets) of instructions to perform any one or more of the methodologies discussed herein.

The example computing device 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a secondary memory (e.g., a data storage device 818), which communicate with each other via a bus 830.

Processing device 802 represents one or more general-purpose processors such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. Processing device 802 is configured to execute the processing logic (instructions 822) for performing the operations and steps discussed herein.

The computing device 800 may further include a network interface device 908. The computing device 800 also may include a video display unit 810 (e.g., a liquid crystal display (LCD) or a cathode ray tube (CRT)), an alphanumeric input device 812 (e.g., a keyboard or touchscreen), a cursor control device 814 (e.g., a mouse or touchscreen), and an audio device 816 (e.g., a speaker).

The data storage device 818 may include one or more machine-readable storage media (or more specifically one or more non-transitory computer-readable storage media) 828 on which is stored one or more sets of instructions 822 embodying any one or more of the methodologies or functions described herein. The instructions 822 may also reside, completely or at least partially, within the main memory 804 and/or within the processing device 802 during execution thereof by the computer system 800, the main memory 804 and the processing device 802 also constituting computer-readable storage media.

The various methods described above may be implemented by a computer program. The computer program may include computer code arranged to instruct a computer to perform the functions of one or more of the various methods described above. The computer program and/or the code for performing such methods may be provided to an apparatus, such as a computer, on one or more computer readable media or, more generally, a computer program product. The computer readable media may be transitory or non-transitory. The one or more computer readable media could be, for example, an electronic, magnetic, optical, electromagnetic, infrared, or semiconductor system, or a propagation medium for data transmission, for example for downloading the code over the Internet. Alternatively, the one or more computer readable media could take the form of one or more physical computer readable media such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

In an implementation, the modules, components and other features described herein can be implemented as discrete components or integrated in the functionality of hardware components such as ASICS, FPGAs, DSPs or similar devices.

A "hardware component" is a tangible (e.g., non-transitory) physical component (e.g., a set of one or more processors) capable of performing certain operations and may be configured or arranged in a certain physical manner. A hardware component may include dedicated circuitry or logic that is permanently configured to perform certain operations. A hardware component may be or include a special-purpose processor, such as a field programmable gate array (FPGA) or an ASIC. A hardware component may also include programmable logic or circuitry that is temporarily configured by software to perform certain operations.

Accordingly, the phrase "hardware component" should be understood to encompass a tangible entity that may be physically constructed, permanently configured (e.g., hardwired), or temporarily configured (e.g., programmed) to operate in a certain manner or to perform certain operations described herein.

In addition, the modules and components can be implemented as firmware or functional circuitry within hardware devices. Further, the modules and components can be implemented in any combination of hardware devices and software components, or only in software (e.g., code stored or otherwise embodied in a machine-readable medium or in a transmission medium).

Although physical hardware components have been described, it would be understood that the above methods could be carried out in a cloud-based environment and/or on virtualized hardware. As such, this phrase "hardware implementation" used in this section encompasses both physical hardware or virtualized hardware in a singular function or shared computing environment, which may be located in dedicated equipment space or hosted equipment in either private or public cloud.

Unless specifically stated otherwise, as apparent from the following discussion, it is appreciated that throughout the description, discussions utilizing terms such as "receiving", "determining", "comparing", "enabling", "maintaining," "identifying", "providing", "applying", "training" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

It is to be understood that the above description is intended to be illustrative, and not restrictive. Many other implementations will be apparent to those of skill in the art upon reading and understanding the above description. Although the present disclosure has been described with reference to specific example implementations, it will be recognized that the disclosure is not limited to the implementations described but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

The invention claimed is:

1. A computer-implemented method for dynamically training a system to determine an age rating for media content, the computer-implemented method comprising:
   receiving a plurality of age ratings of a plurality of content items for a source territory, a target territory, and at least one other territory;
   determining, based on the plurality of age ratings, a prediction score indicative of a similarity between age ratings of the source territory and the target territory and at least one other prediction score indicative of a similarity between age ratings of the at least one other territory and the target territory;
   determining, from the source territory and the at least one other territory, a territory associated with a highest prediction score;
   executing, on an input content item with a first age rating in the source territory, a machine learning model that outputs a second age rating of the input content item in the target territory, wherein the machine learning model is trained using age ratings of at least the target territory, the territory associated with the highest prediction score and the source territory when the territory associated with the highest prediction score is not the source territory; and
   in response to determining that the second age rating exceeds a parental control threshold, blocking access the input content item.

2. The computer-implemented method of claim 1, wherein the parental control threshold and the first age rating are set in a first rating scale of the source territory, and wherein the second age rating is set in a second rating scale of the target territory and is incompatible for direct comparison with the parental control threshold.

3. The computer-implemented method of claim 1, further comprising generating an alert indicative of a parental control when the input content item is requested for access.

4. The computer-implemented method of claim 3, wherein the input content item is accessed on a media content platform that is accessible in the source territory and the target territory, and wherein the alert is generated on a graphical user interface of the media content platform.

5. The computer-implemented method of claim 1, wherein the input content item comprises media content.

6. The computer-implemented method of claim 1, wherein the plurality of content items comprises thousands of content items.

7. The computer-implemented method of claim 1, wherein the at least one other territory comprises a plurality of territories.

8. The computer-implemented method of claim 1, wherein determining the prediction score and the at least one other prediction score further comprises determining a similarity vector by generating a similarity matrix comprising a plurality of similarity vectors for a plurality of pairs of territories.

9. The computer-implemented method of claim 8, further comprising clustering the plurality of similarity vectors into clusters.

10. The computer-implemented method of claim 1, further comprising determining one or more highest prediction scores by: (a) selecting one or more prediction scores exceeding a threshold, or (b) selecting a predetermined number of prediction scores having a highest value, or (c) selecting prediction scores within a set number of standard deviations above a mean prediction score.

11. A system for dynamically training a media classification system to determine an age rating for media content, the system comprising:
a memory; and
a processor configured to implement instructions on the memory to configure the media classification system to:
receive a plurality of age ratings of a plurality of content items for a source territory, a target territory, and at least one other territory;
determine, based on the plurality of age ratings, a prediction score indicative of a similarity between age ratings of the source territory and the target territory and at least one other prediction score indicative of a similarity between age ratings of the at least one other territory and the target territory;
determine, from the source territory and the at least one other territory, a territory associated with a highest prediction score;
execute, on an input content item with a first age rating in the source territory, a machine learning model that outputs a second age rating of the input content item in the target territory, wherein the machine learning model is trained using age ratings of at least the target territory, the territory associated with the highest prediction score and the source territory when the territory associated with the highest prediction score is not the source territory; and
in response to determining that the second age rating exceeds a parental control threshold, block access the input content item.

12. The system of claim 11, wherein the processor is further configured to implement instructions on the memory to set the parental control threshold and the first age rating in a first rating scale of the source territory, and to set the second age rating in a second rating scale of the target territory and that is incompatible for direct comparison with the parental control threshold.

13. The system of claim 11, wherein the processor is further configured to implement instructions on the memory to generate an alert indicative of a parental control when the input content item is requested for access.

14. The system of claim 13, wherein the processor is further configured to implement instructions on the memory to access the input content item on a media content platform that is accessible in the source territory and the target territory, and to generate the alert on a graphical user interface of the media content platform.

15. The system of claim 11, wherein the input content item comprises media content.

16. The system of claim 11, wherein the processor is further configured to implement instructions on the memory to determine the prediction score and the at least one other prediction score by determining a similarity vector by generating a similarity matrix comprising a plurality of similarity vectors for a plurality of pairs of territories.

17. The system of claim 16, wherein the processor is further configured to implement instructions on the memory to cluster the plurality of similarity vectors into clusters.

18. The system of claim 11, wherein the processor is further configured to implement instructions on the memory to determine one or more highest prediction scores by: (a) selecting one or more prediction scores exceeding a threshold, or (b) selecting a predetermined number of prediction scores having a highest value, or (c) selecting prediction scores within a set number of standard deviations above a mean prediction score.

* * * * *